May 24, 1955  R. S. REYBURN  2,709,109
UTILITY WAGON

Filed April 8, 1952  2 Sheets-Sheet 1

INVENTOR
Richard S. Reyburn

ATTYS

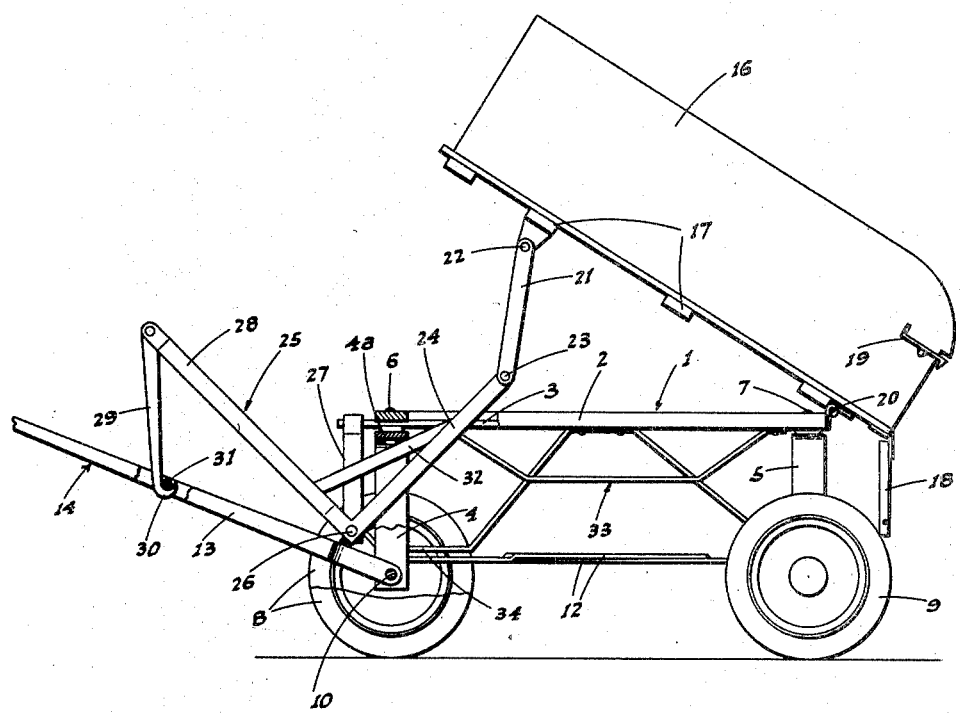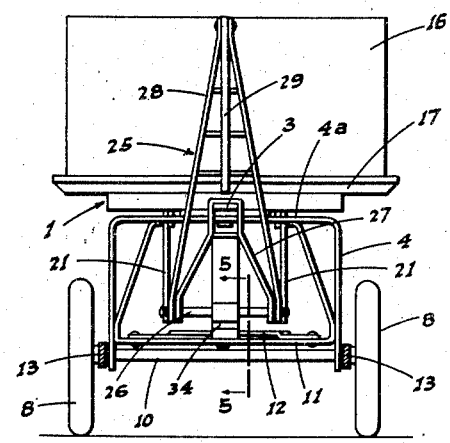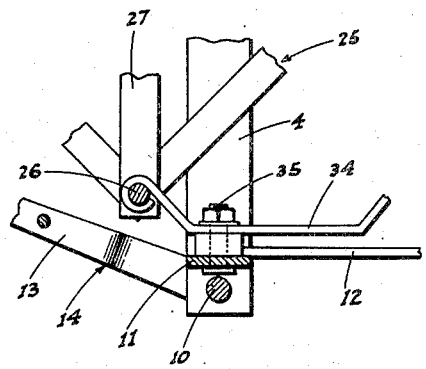

United States Patent Office 2,709,109
Patented May 24, 1955

2,709,109
UTILITY WAGON
Richard S. Reyburn, Ontario, Calif.

Application April 8, 1952, Serial No. 281,080

3 Claims. (Cl. 298—19)

This invention relates to a utility hand-operated wagon, of a relatively small size, and particularly designed for use in any place where small quantities of material such as trash, dirt and the like are to be hauled to any desired point and then dumped.

The wagon will therefore be of use in a home garden, or around a farm, factory, or the like.

A major object of the invention is to provide a wagon of this general type having four supporting wheels, and a body which may be readily tipped for dumping at the option of the operator, without lifting the wheels from the ground.

The wagon includes a handle unit for pulling the wagon and which is mounted for swivel movement in a vertical plane so that ordinarily the handle unit accommodates itself to the person hauling the wagon. It is another object of the invention to provide a normally inactive dump controlling mechanism for the body, and means to connect such mechanism to the handle unit only when a dumping action is desired, and which then functions upon a depressing movement being imparted to the handle.

The wheels of the wagon are all steerable, the handle unit being connected to the front wheels and the front and rear wheels being connected together in such a manner that a very short steering radius for the wagon is had which enables the same to be turned in cramped quarters, making the wagon extremely suitable for garden use.

In connection with this ready steering or wheel-turning feature, it is another object of the invention to so arrange the dump control mechanism in connection with the front steerable wheel mount that when the wagon body is tilted to dumping position, said front wheels, and consequently the rear wheels as well, are maintained in a neutral or longitudinally alined position, so that there is no danger of the wagon overturning sideways, or the discharge end of the wagon shifting laterally out of its desired point of discharge.

A still further object of the invention is to provide a utility wagon which is designed for ease and economy of manufacture.

It is also an object of the invention to provide a practical and reliable utility wagon, and one which will be exceedingly effective for the purpose for which it is designed.

These objects are accomplished by means of such structure and relative arrangement of parts as will fully appear by a perusal of the following specification and claims.

In the drawings:

Fig. 3 is a side elevation of the wagon with the body tilted for dumping; certain parts being broken away and in section.

Fig. 4 is a front view of the wagon, with the side bars of the handle member cut off.

Fig. 5 is a fragmentary enlarged longitudinal section, taken on line 5—5 of Fig. 4.

Figure 1:
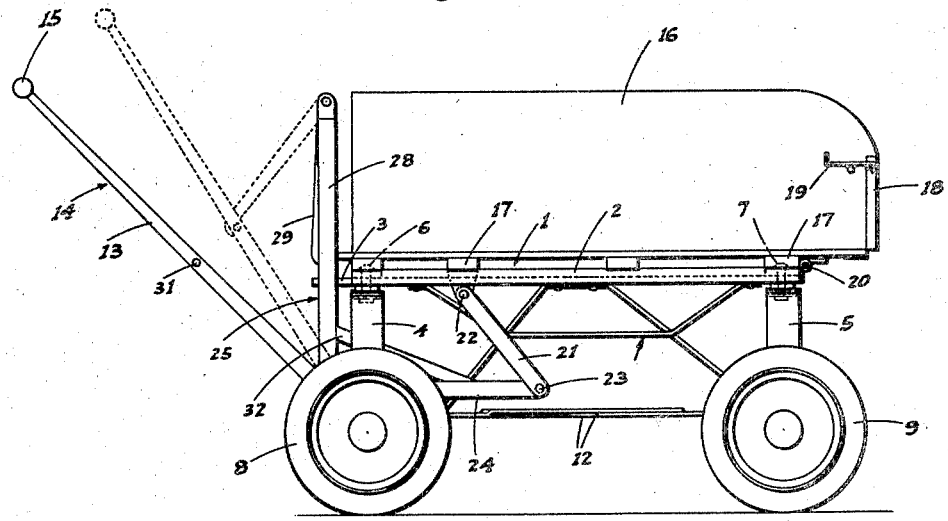
Fig. 1 is a side elevation of the wagon in its normal or load carrying position.
Figure 2:
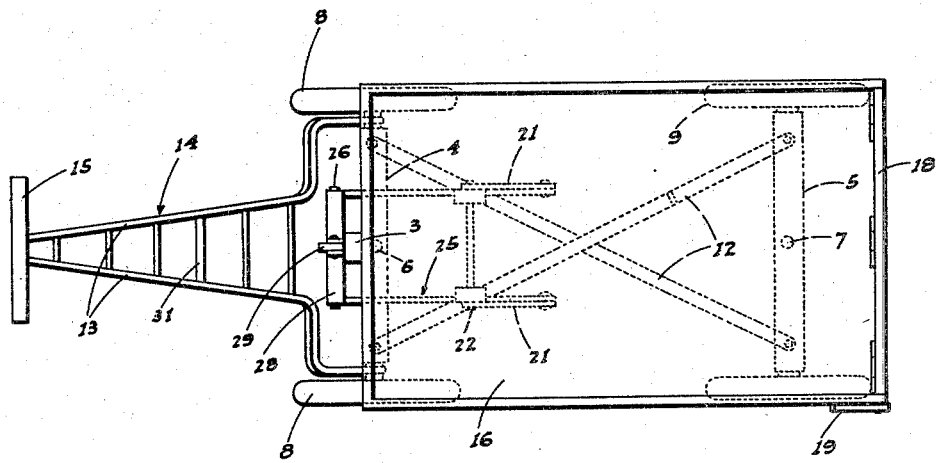
Fig. 2 is a top plan view of the wagon.

Referring now more particularly to the characters of reference on the drawings, the wagon comprises a main horizontal frame 1 which includes side beams 2 and a central longitudinal beam 3.

Depending from the front and rear end of the frame are hangers or yokes 4 and 5 respectively, the top cross members of which are pivoted on the main frame on vertical axis king pins 6 and 7 respectively. The yokes at their lower end support axles on which the front and rear wheels 8 and 9 are mounted, the front axle being shown at 10.

Each yoke includes, just above the corresponding axle, a cross bar 11, the cross bars of the two yokes being connected by crossing links 12 so that upon turning of the front yoke 4 on its king pin 6, the rear wheel yoke 5 is turned in the opposite direction, causing the front and rear wheels to track in the same circular path and enabling the wagon to turn in a very short radius.

Turnable on the front axle 10 adjacent the yoke 4 are the arms 13 of a handle unit 14, which arms converge thence to connection at their forward end with a cross handle bar 15.

The body 16 of the wagon includes bottom cross members 17 normally resting on main frame 1, and a hinged downwardly opening rear end gate 18 normally held closed by a suitable latch 19.

The body is hinged adjacent its rear end on the main frame at its rear end as at 20, and toward its forward end but rearwardly of the forward end of the main frame, is provided with a pair of depending links 21, disposed in straddling relation to the central beam 3 and pivotally mounted at their upper end in connection with one of the cross members 17 as at 22.

At their lower end, the links are pivoted as at 23 on the rear end of the transversely spaced normally horizontal legs 24 of a bellcrank unit 25. This unit is pivoted on a cross pin 26 supported in the transversely spaced legs of a hanger 27 mounted on and depending from the front end of beam 3, which projects ahead of the main frame a short distance for this purpose. The normally upstanding legs 28 of the bellcrank unit straddle the hanger 27 and converge to their upper end as shown in Fig. 4 to there support a depending link 29 or the like which on its lower end carries a hook 30. This hook is adapted to releasably engage a cross pin 31 extending between the arms 13 of handle unit 14, the length of link 29 being such that the handle unit must be swung up somewhat close to the leg 28 of the bellcrank unit before such engagement can be effected, as indicated in dotted lines in Fig. 1.

It will thus be seen that when link 29 is hooked to the handle unit and pressed down, the wagon body 16 will be tipped upwardly about hinge 20, so that the contents of the body may be discharged upon the rear end gate being opened. In order to prevent the handle unit from being depressed sufficiently to allow the links 21 and adjacent bellcrank arms 24 to move beyond dead center, and to also prevent turning of the front wheel yoke when the body is fully tilted, brace straps 32 connect the bellcrank legs and are arranged so that when a fully tilted body position has been reached, such braces engage the top cross member 4a of yoke 4, as shown in Fig. 3. Since said braces are laterally spaced, they prevent turning of said member and the yoke and wheels 8 as a unit about the king pin 6, and maintain the wheel yokes rigid with the frame and the structure as a whole in a stable condition.

The frame includes a central brace system 33 comprising a number of laterally horizontal straps, one such strap 34 extending across bar 11 and being pivoted thereto by a vertical pin 35 alined with the upper king pin 6, and extending thence to engagement with the cross pin 26 of hanger 27 to brace the latter (see Fig. 5). One of the straps of the brace system similarly braces the yoke 5 of the rear wheels.

While the above described wagon is particularly designed for adult use, it may also be made in sizes suitable for children, since the dumping action will fascinate them, and will be an incentive for a child to be of actual help around the home or garden.

From the foregoing description it will be readily seen that there has been produced such a device as will substantially fulfill the objects of the invention as set forth herein.

While this specification sets forth in detail the present and preferred construction of the device, still in practice such deviations therefrom may be resorted to as do not form a departure from the spirit of the invention, as defined by the appended claims.

Having thus described the invention, the following is claimed as new and useful, and upon which Letters Patent are desired:

1. A utility wagon comprising a horizontal frame having front and rear supporting wheels, a steerable yoke depending from the frame and in which the front wheels are mounted, a forwardly extending handle unit pivotally connected to the yoke for swivel movement in a vertical plane, a body normally supported on the frame, a hinge connecting the frame and body adjacent the rear end of the latter for upward tilting of the body to a dumping position, a tilt control mechanism connected to the body and frame, means to releasably connect said mechanism to the handle unit to actuate the mechanism and tilt the body upon a downward movement of the handle unit from a predetermined position, and means between said mechanism and the yoke to hold the latter in a normal position and against steering movement upon the body being tilted to a dump position.

2. A utility wagon comprising a horizontal frame having front and rear supporting wheels, a steerable yoke depending from the frame and in which the front wheels are mounted, a forwardly extending handle unit pivotally connected to the yoke for swivel movement in a vertical plane, a body normally supported on the frame, a hinge connecting the frame and body adjacent the rear end of the latter for upward tilting of the body to a dumping position, the yoke including a top cross bar, a bellcrank unit pivotally supported from the frame ahead of the yoke and including transversely spaced legs projecting rearwardly and below the cross bar, and an upstanding leg; links connected to the first named legs and the bottom of the body ahead of the hinge, means to releasably connect the upstanding leg to the handle unit to pull said leg down and swing the first named legs upon a downward movement being imparted to the handle unit, and elements connected to said first named legs to engage the cross bar and maintain the same in a right angle transverse position upon a swinging movement of the bellcrank unit to a full body-tilting position.

3. A utility wagon comprising a horizontal frame having front and rear supporting wheels, a steerable yoke depending from the frame and in which the front wheels are mounted, the yoke comprising a top cross bar and transversely spaced depending side arms, a forwardly extending handle unit including side arms connected to the yoke arms adjacent their lower end, a body normally supported on the frame and hinged adjacent its rear end thereon for upward tilting of the body to a dumping position, a frame element projecting forwardly between the side arms of the yoke adjacent its lower end, a bellcrank unit pivoted on the forward end of the frame element and including an upwardly projecting leg and a rearwardly extending leg projecting between the yoke arms, a link connecting the rearwardly extending leg and the bottom of the body ahead of the hinge thereof, and means to releasably connect the upstanding leg to the handle unit; the yoke including a bottom cross bar adjacent the level of said frame element, and vertically alined king pins connecting the frame and top cross bar and the frame element and bottom cross bar.

References Cited in the file of this patent

UNITED STATES PATENTS

| | | |
|---|---|---|
| 790,495 | Gledhill | May 23, 1905 |
| 1,394,521 | Akers | Oct. 25, 1921 |
| 1,599,465 | Gilmore | Sept. 14, 1926 |
| 1,803,688 | Barrett | May 5, 1931 |